United States Patent [19]

Matsumoto

[11] 4,336,560
[45] Jun. 22, 1982

[54] PULSE-OPERATED MODE SWITCHING MECHANISM FOR TAPE RECORDERS

[75] Inventor: Sigeru Matsumoto, Yokohama, Japan

[73] Assignee: Victor Company of Japan, Limited, Yokohama, Japan

[21] Appl. No.: 134,990

[22] Filed: Mar. 28, 1980

[30] Foreign Application Priority Data

Mar. 30, 1979 [JP] Japan ................. 54-38006

[51] Int. Cl.³ ............................................. G11B 15/00
[52] U.S. Cl. ..................................... 360/137; 360/61
[58] Field of Search .................. 360/137, 61, 62, 105, 360/74.1, 71

[56] References Cited

U.S. PATENT DOCUMENTS 4,225,894  9/1980  Fulukawa ............................ 360/137
4,232,349  11/1980 Kobayoshi .......................... 360/137

Primary Examiner—Vincent P. Canney
Assistant Examiner—Alan Faber
Attorney, Agent, or Firm—Lowe, King, Price & Becker

[57] ABSTRACT

A pulse-operated mode switching mechanism for tape recorders comprises a single solenoid operated in response to a pulse of different periods depending on the function of the operating key. A rotary wheel is driven by a motor to provide a 360° revolution in response to the energization of the solenoid. Electromagnetic transducer heads are mounted on a carrier plate which is movable between a first position in which the heads are remote from the tape and a second position in which the tape is in contact with the heads. The carrier plate is moved from the first to second position by the rotation of the rotary wheel when the solenoid is energized for an interval greater than a first predetermined interval and returned to the first position in response to the energization of the solenoid. During playback or recording mode the solenoid is energized for an interval greater than the first predetermined interval so that the transducer heads are brought into contact with the tape. With the transducer heads in their tape contact positions, cueing control or the like is effected by energizing the solenoid for an interval smaller than the first predetermined interval but greater than a second predetermined interval. The pulse of this interval causes the carrier member to be locked in an intermediate position between its first and second positions during its return movement. The mechanism is restored to a stop position in response to a pulse with a duration smaller than the second predetermined interval.

15 Claims, 8 Drawing Figures

PULSE-OPERATED MODE SWITCHING MECHANISM FOR TAPE RECORDERS

BACKGROUND OF THE INVENTION

The present invention relates generally to tape recording and reproducing apparatus, and in particular to a pulse-operated mechanism for tape recorders. The invention is particularly suitable for use in battery-powered portable cassette tape recorders.

Mode switching mechanisms that are currently employed in tape recorders are broadly classified into mechanically an electrically operated types. Since the latter type permits selection of a desired mode in response to a featherly touch on the associated key or switch, it has gained wide popularity among users. However, the conventional electrically operated tape control mechanism employs a plurality of solenoids which are associated with different operating keys. This requires a substantial amount of power for operating various mechanical elements particularly because the circuitry is designed so that the solenoids remain energized during the time the recorder is being operated. Although this continuous power operation may find use in applications where the power is supplied from an external a.c. source, application to battery powered portable tape recorders is not possible due to excessive power consumption. Furthermore, use of a plurality of solenoids increases both size and manufacturing cost of the recorder.

Attempts have recently been made to reduce the amount of power consumption. One such method involves operating a solenoid or solenoids for a brief period during mode switching and locking the mechanism after it has been switched to the desired mode. Such method, however, makes use of pressure engaging action of a pinch roller, so that the operating solenoid has to bear a large amount of loading and consequently the amount of power consumption is still not satisfactory level for portable tape recorders. Another approach involves the use of an additional motor coupled with a plurality of solenoids which are responsive to input pulses for driving the motor to provide various switching operations. Disadvantage of the latter method is the complexity of mechanism and a high manufacturing cost.

SUMMARY OF THE INVENTION

The present invention utilizes to operate a single solenoid in responsive to pulses of different period according to the function of an operated key. A rotary wheel is provided which is driven by a capstan motor to provide a 360° revolution in response to the solenoid being energized. Electromagnetic transducer heads are mounted on a slide plate or carrier which is movable from a first position in which the heads are located remote from the recording tape to a second position in which the tape is in contact with the heads. The rotary movement of the wheel is utilized to move the carrier from the first to second position when the solenoid is energized for an interval greater than a first predetermined interval. More specifically, an interval of 0.6 seconds is chosen for a solenoid activating pulse associated with playback or recording operation, so that during this interval the first predetermined interval is allowed to lapse to cause the carrier to move to the second, or tape contacting position. The return movement of the carrier from the second to first position is effected in response to the energization of the solenoid by a spring action. A locking mechanism, which is operated in response to the operation of the solenoid, comes into engagement with the carrier in an intermediate position between its first and second positions during its return movement when the solenoid is energized for an interval greater than a second predetermined value which is smaller than the first predetermined value. In the intermediate position the transducer heads are positioned slightly away from the tape surface to permit cueing operation or the like. The activating pulse for this purpose is chosen to have an interval of 0.3 seconds, for example, which is smaller than the first predetermined interval but greater than the second predetermined interval. The tape recorder is switched to the stop position by energizing the solenoid for an interval smaller than the second predetermined interval to set the rotary wheel in motion to return the carrier to its first position. The pulse interval for the stopping operation is 0.1 seconds. Switching from cueing to playback operation is achieved through solenoid energization for the same interval as employed to effect playback from the stop position. The application of a pulse of this length allows the carrier to move from the intermediate position to the tape contact position by the rotary movement of the rotary wheel.

An object of the present invention is to provide an improved pulse-operated mode switching mechanism for tape recorders using a single solenoid which requires a considerably small amount of power during both transient and steady operating conditions.

Another object of the invention is to provide a pulse-operated mode switching mechanism which is compact and inexpensive.

Since the rotary movement of a wheel is utilized for operating various mechanical elements, the mechanism according to the invention assures shock-free switching operations.

Therefore, a further object of the invention is to provide a pulse-operated mechanism which is reliable in operation and usable for an extended period of time.

BRIEF DESCRIPTION OF THE DRAWINGS

The various features and advantages of the present invention will be understood from the following detailed description read in conjunction with the accompanying drawings in which.

DETAILED DESCRIPTION

Figure 1:
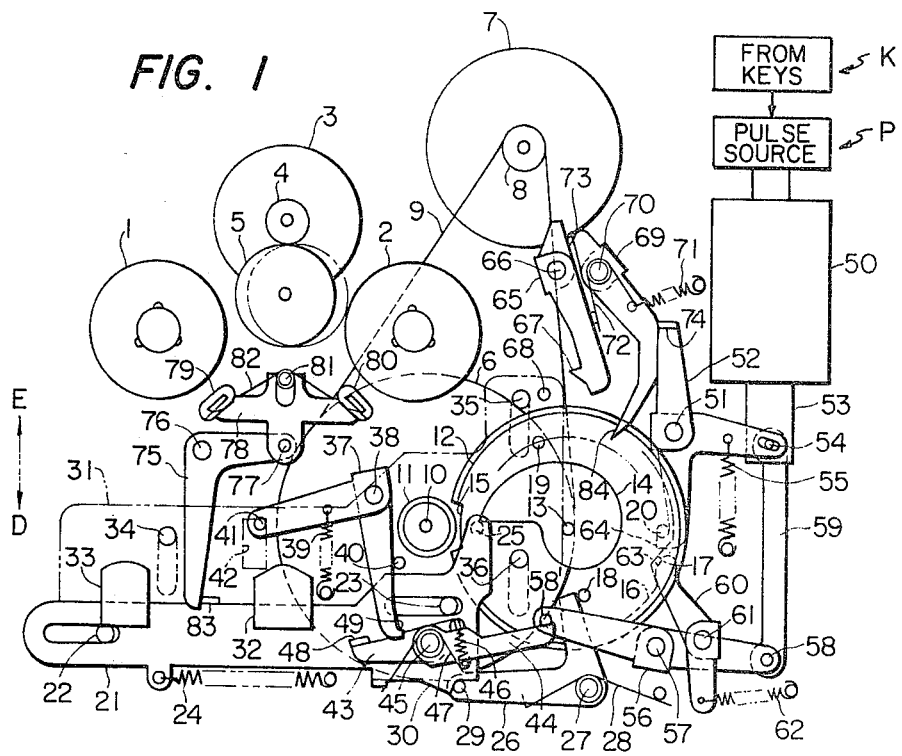
FIG. 1 is a diagrammatic illustration of the pulse-operated mode switching mechanism of the invention with the various elements shown in their stop positions.

Referring now to FIG. 1, a mode switching mechanism for a cassette tape recorder embodying the principles of the invention is illustrated in plan view with the various parts shown in their stopped positions. The tape recorder of FIG. 1 includes supply reel wheel 1, takeup reel wheel 2, and reel motor 3. A pulley 4 mounted on the rotor shaft of reel motor 3 drives one of the reels by means of an idler 5 capable of selective engagement with the reel wheels.

A capstan 10 is connected to the center of a flywheel 6 indicated by a dashed line which is connected to a pulley 8 of a motor 7 by a belt 9. Recording tape is engaged between the capstan 10 and a pinch roller which is not shown for simplicity when the recorder is in playback or other operating modes as in conventional manner. A toothed wheel 11, mounted for rotation with the capstan 10, is adapted to come into engagement with the toothed control wheel 12 mounted on a shaft 13 on the chassis frame or baseplate, not shown, to set the tape recorder in a selected mode of operation as will be described later.

Figure 8:
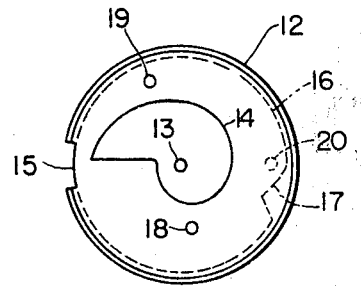
FIG. 8 is an illustration of the detail of the rotary or control wheel and a cam mounted thereon for rotation therewith.

As shown in detail in FIG. 8, the control wheel 12 carries thereon a rotary cam 14 about shaft 13 and pins 18 and 19, and is integrally formed with a toothed wheel 16 of a smaller diameter having a notch 17 and a pin 20 therebeneath. The control wheel 12 has a notch 15 to disengage it from contact with the toothed wheel 11.

A control member 21 having a pair of guide slots in which guide pins 22 and 23 are respectively provided, is movably mounted on the baseplate and normally urged to the right by means of a spring 24. To the right end of the control member 21 is attached a pin 25 which is in contact with the cam 14 so that the control member 21 is caused to move to the left against the action of spring 24 with the rotation of the control wheel 12 until it rapidly returns to the rightward position by the spring 24 when pin 25 encounters the straight edge of the cam 14.

A bell crank 26, pivoted at 27 and biased clockwise by a spring 28, has a pin 29 at the left end thereof which comes into engagement with a lug 30 of the control member 21 to lock it in place against the action of the spring 24 when the bell crank 26 engages the pin 18 of the control wheel 12. The bell crank 26 is rotated counterclockwise by the pin 18 as the wheel 12 rotates clockwise, so that the control member 21 is disengaged from contact with pin 29 and is restored to the rightward position by the action of spring 24.

A slide baseplate 31, shown in a chain-dot line, carries thereon a recording-playback head 32 and an erase head 33 and is adapted to move between playback and stop positions by means of bell crank 37. The latter is pivoted at 38 on the chassis frame and urged counterclockwise by a spring 39 to come into engagement with a stopper pin 40 mounted on the frame. The slide baseplate 31 is formed with an opening 42 in which pin 42 of the bell crank 37 is inserted. A clockwise rotation of bell crank 37 will thus cause the slide plate 31 to move to the playback position guided by pins 34, 35 and 36.

A hook lever 43 and a kick lever 44 are pivotally mounted on a pivot 45 on the control member 21 and interconnected by a spring 46. Normally, the levers 43 and 44 rotate as a unitary piece about its pivot and are urged in a counterclockwise direction by a spring 47. The hook lever 43 has a lug 48 which is adapted to come into engagement with a hooked end portion 49 of the bell crank 37 when the control plate 21 is in the right position, whereby the leftward movement of the control plate 21 will cause the bell crank 37 to rotate clockwise.

Numeral 50 is a solenoid whose plunger 53 is operatively connected by a pin 54 to an arm of a bell crank 52 which is pivoted at 51 on the chassis frame so that the bell crank 52 is rotated counterclockwise when the plunger 53 is pulled into its retracted position against the action of a return spring 55. The plunger 53 is further connected by a connecting rod 59 and a pin 58 to an end of a lever 56 pivoted at 57, the lever 56 having a pin 58' which is in contact with the kick lever 44 so that when the solenoid 50 is energized to pull the plunger 53, the hook and kick levers 43 and 44 are rotated clockwise.

A bell crank 60, pivoted at 61 on the chassis frame, is biased by a spring 62 in a counterclockwise direction to bring its one end 63 to come into engagement with the recessed portion 17 of the control wheel 12 in order to give it a clockwise rotation when the solenoid 50 is being energized. The bell crank 52 has a hooked end 64 which engages the underside pin 20 of the control wheel 12 when the plunger 53 is in its extended position as the solenoid 50 is de-energized to prevent the control wheel 12 from rotating clockwise and under this condition the wheel 12 is disengaged from meshing contact with the wheel 11 as illustrated in FIG. 1.

A lock lever 65, pivoted at 66 on the chassis frame, has a lug 67 adapted to engage on its lower surface a pin 68 of the slide baseplate 31. A lock release lever 69 is provided which is pivoted at 70 and biased counterclockwise by means of a spring 71. A leaf spring 72, supported on the pivot 70, urges the lock lever 65 to engage its lug 67 with the pin 68 by giving it a clockwise rotation. However, this clockwise rotation is limited by a lug 73 when the latter comes into engagement with an arm of the lock release lever 69.

The lock release lever 69 is in abutment contact with an arm 74 of the bell crank 52 by the action of the spring 71 so that an end portion 84 of its arcuate arm is disengaged from contact with the pin 19 of the control wheel 12 when the solenoid 50 is de-energized.

Numeral 75 denotes a bell crank for braking the reels 1 and 2 which is pivoted at 76 and operatively connected with a brake member 78 by a pin 77. The brake member 78 is provided with a pair of brake pads 79 and 80 for making frictional contact with the supply and takeup reels 1 and 2, respectively, by a leaf spring 82 supported on a pin 81 with which the brake member 78 is guided when the bell crank 75 is free from contact with a stop 83 of the control member 21. In the illustrated stop position, the bell crank 75 is in abutment with the stop 83 to maintain the braking pads 79 and 80 to be spaced a distance from the reels 1 and 2.

Figure 2:
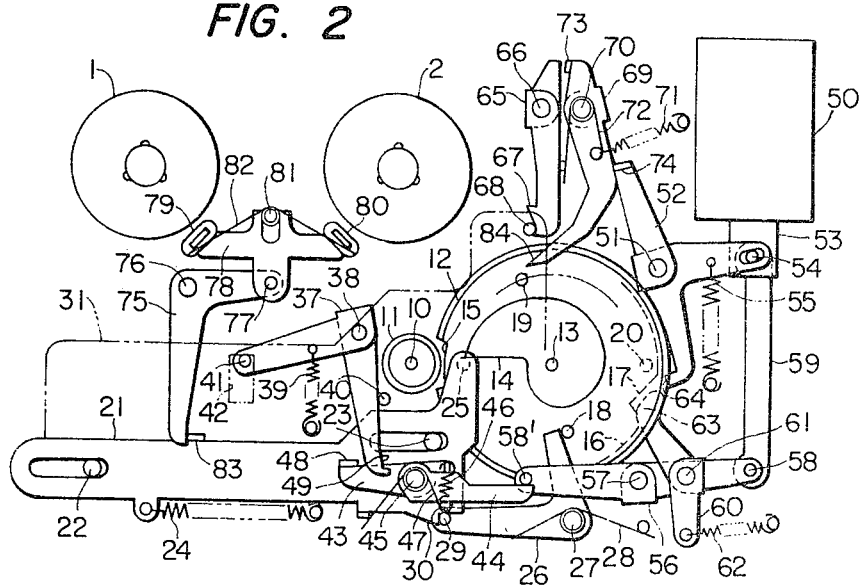
FIG. 2 is an illustration of the mechanism with the various elements shown in positions immediately after the energization of the solenoid.

The operation of the tape recorder of the invention will be understood as the description proceeds as follows with reference to FIGS. 2–7. In the electrically operated tape recorder of the invention, operating signals are generated when the user manually activates a desired key K (shown in FIG. 1 only) through control circuitry P (FIG. 1 only). FIG. 2 is an illustration of the various parts of the tape recorder when it is operated in response to a control signal that energizes the solenoid 50. More specifically, the plunger 53 is pulled into its retracted position and the bell crank 52 is rotated counterclockwise to disengage it from contact with the pin 20 of the control wheel 12. The lever 56 is rotated counterclockwise by the connecting rod 59 to turn the interconnected levers 43 and 44 clockwise against the spring 47. The lock release lever 69 is also rotated clockwise by the counterclockwise rotation of the bell crank 52 against the spring 71 to rotate the lock lever 65 until the lower surface of the lug 67 engages the pin 68 of the slide baseplate 31. Under these conditions, the control wheel 12 is not set in rotation and the control member 21 remains locked with the lever 26 as in FIG. 1.

According to the present invention, the solenoid 50 is energized for an interval which is varied in accordance with different modes including playback, fast-forward, rewinding and cueing operations.

Figure 3:
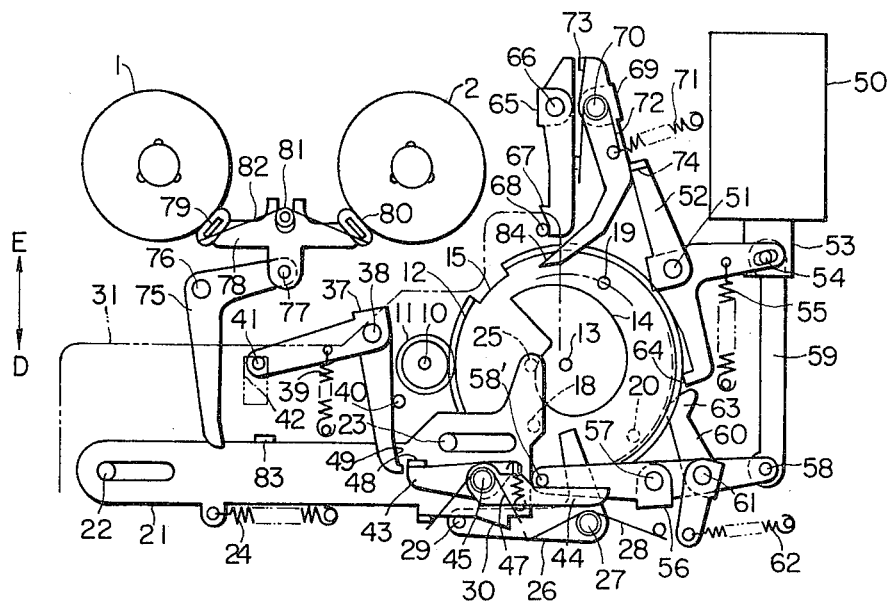
FIG. 3 is an illustration of the mechanism with the various elements shown in positions which occur after the positions of FIG. 2 when the solenoid is energized for an interval of 0.6 seconds.

FIG. 3 is an illustration of the same parts of the recorder mechanism as in FIG. 2 with the control wheel 12 shown as being set in rotation in response to the operation of the playback key. The solenoid 50 is energized for an interval of about 0.6 seconds in response to the manual operation of the playback key, which causes the various parts of the mechanism to change their positions as illustrated in FIG. 2 and subsequently to the positions shown in FIG. 3. More specifically, after energization of the solenoid 50 the bell crank 52 is disengaged from contact with the pin 20 to give a clockwise torque to the control wheel 12 by the counterclockwise biasing of the startup lever 60, so that the wheel 12 comes into meshing engagement the wheel 11. Since the capstan motor 7 has been set in motion in response to the operation of the playback key, the control wheel 12 is set in clockwise rotation causing its pin 18 to rotate the bell crank 26 to disengage it from the abutment contact with the lug 30 of the control member 21, so that the latter is released from the locked condition and moves to the right to the position indicated in FIG. 3 by the action of the spring 24.

As seen from FIG. 2, the lug 48 of the hook lever 43 is positioned to the left of the hooked end 49 of the bell crank 37 immediately after the solenoid 50 is energized. The lug 48 is shifted to the right of the hooked end 49 as shown in FIG. 3 which will be explained by reference to FIG. 4.

Figure 4:
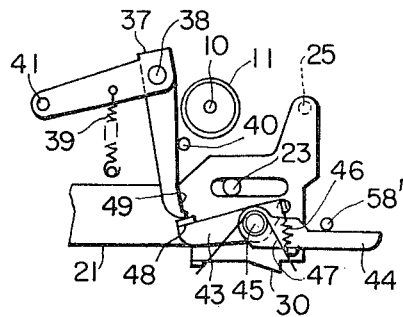
FIG. 4 is an illustration of a part of the mechanism useful for explaining the operation of a hook lever as it changes from the FIG. 2 to FIG. 3 position.
Figure 5:
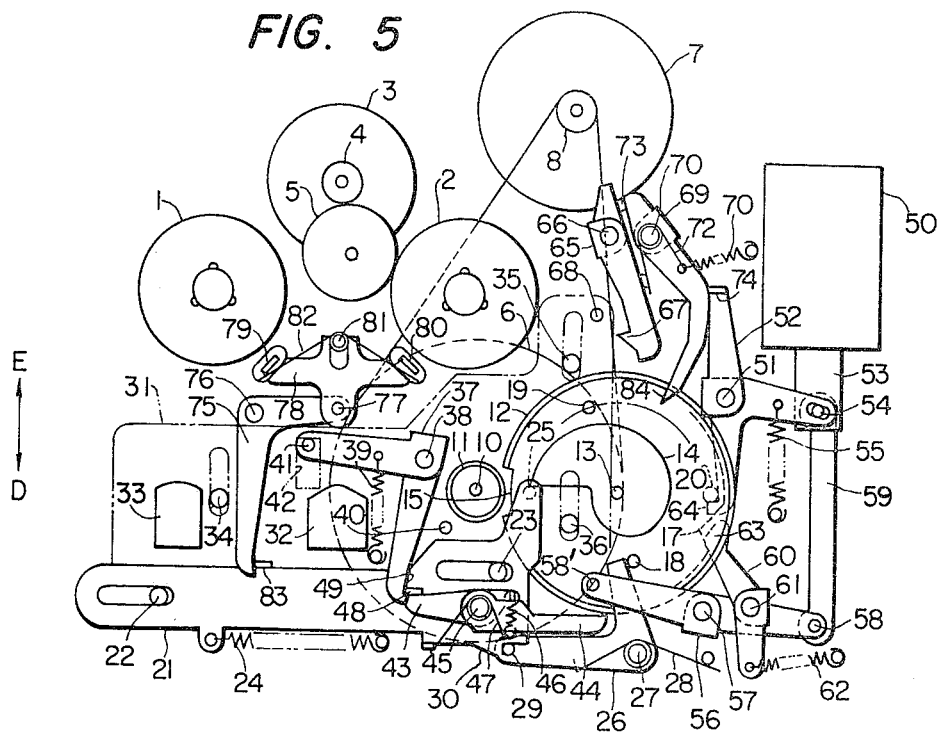
FIG. 5 is an illustration of the mechanism with the various parts shown in positions which occur subsequent to the positions of FIG. 3 after the solenoid is de-energized.

As the control plate 21 moves to the right as soon as it is released from the locked condition, the levers 43 and 44 are also moved to the right so that the lug 48 comes into engagement with the camming surface of the bell crank 37 adjacent the hooked end 49 and as a result the hook lever 43 is caused to rotate about pivot 45 against the action of spring 46 as seen in FIG. 4 and then returns to the original position (FIG. 3) as it has moved past the hooked end 49. The control plate 21 is then moved to the left by the rotation of cam 14 and the lug 48 comes into abutment with the hooked end 49 of the bell crank 37 to give it a clockwise rotation about pivot 38. This causes the slide member 31 to move in the direction indicated by the arrow E. During this movement pin 68 is in camming contact with the cam surface of the lug 67 of the lock lever 65, so that the latter is slightly rotated counterclockwise to allow the slide member 31 to move to the position as shown in FIG. 5 until guide pins 34 and 35 prevent its further movement. In response to the termination of the 0.6-second period of energization, the solenoid 50 is de-energized to return its plunger 53 to its extended position causing the bell crank 52 to rotate clockwise to allow the levers 69 and 65 to return to their stop positions. After a complete rotation from the position of FIG. 2, the control wheel 12 is again disengaged from meshing contact with the drive wheel 11.

After completion of the leftward movement, the control member 21 is again locked in position by the bell crank 26 with the lug 83 being in abutment with the bell crank 75 to disengage the brake pads 79 and 80 from contact with the reels 1 and 2. The slide plate 31 is held in the playback position by the bell crank 37 since the latter is engaged with the hook lever 43 mounted on the control member 21, so that the playback/recording head 32 and erase head 33 are brought into an appropriate position with respect to the recording tape, not shown, which is transported by engagement between the capstan 10 and the pinch roller. The idler 5 is of course moved to a position between the motor pulley 4 and takeup reel 2 in a manner which is well known in the art.

The tape recorder can be set in a fast-forward mode in a well known manner in which the reel drive motor 3 is driven at a high speed with the various parts of the mechanism positioned in their stop positions as indicated in FIG. 1 with the exception that the idler 5 is positioned between the pulley 4 and takeup reel 2 as indicated by a chain-dot line. Since the brake pads are located a distance from the reels 1 and 2 in their stop positions, it is not necessary to energize the solenoid 50. Likewise, rewinding operation is effected in the conventional manner in which the motor 3 is driven at a high speed in the opposite direction of rotation with the idler 5 being positioned between the pulley 4 and supply reel 1.

Figure 6:
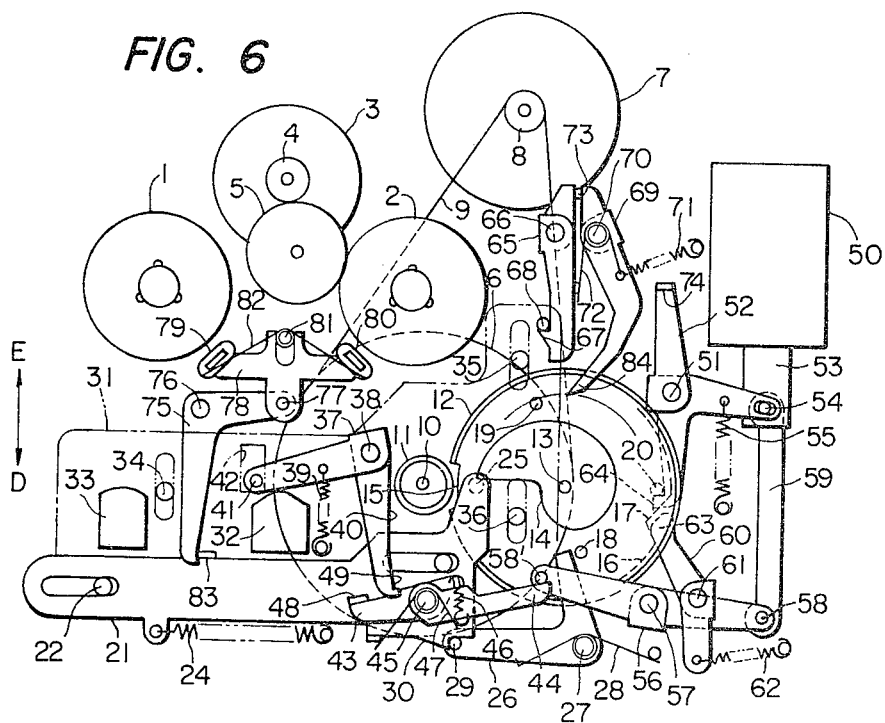
FIG. 6 is an illustration of the mechanism which is operated by a 0.3-second pulse after the mechanism is switched to the FIG. 5 (playback) position.

FIG. 6 is an illustration of the tape recorder in audible cueing operation with which a desired recorded material is searched by reproducing the tape at a higher speed than the normal playback speed. In this cueing operation, the playback head 32 is located slightly away from the tape surface to maintain slight contact therewith. For this purpose, the slide plate 31 is displaced a distance of 1.5 mm to 2 mm away from its playback position in the direction indicated by the arrow D. As a result of this displacement the recording tape is not driven by the capstan 10 but driven at high speeds by the reels 1 or 2 depending on the direction of search.

In order to set the tape recorder in the cueing mode from the playback mode, the solenoid 50 is energized for an interval of about 0.3 seconds and during this energization interval the recorder mechanism is in the same active positions as indicated in FIG. 3 with the exception of the position of the slide plate 31. More specifically, in FIG. 6, the energization of solenoid 50 sets the control wheel 12 in clockwise rotation which subsequently causes the pin 18 to turn the bell crank 26 to unlock the control plate 21 from its left position to allow it to move the right position. The bell crank 52 is rotated counterclockwise simultaneously with the energization of solenoid 50 to rotate the lock release lever 69 clockwise and hence the lock lever 65 is moved to a position adapted to engage the pin 68 of slide plate 31. The rightward movement of control member 21 causes the hook lever 43 to rotate the bell crank 37 counterclockwise, so that the slide plate 31 is moved in the arrow direction D from the position shown in FIG. 5 until the pin 68 comes into engagement with the lug 67 of the lock lever 65.

After de-energization of the solenoid 50, the control wheel 12 continues its clockwise rotation and in response to the completion of a 360° revolution the pin 20 engages the hooked end 64 of bell crank 52 to stop the control wheel 12 in the position indicated in FIG. 6 with the control member 21 being located in the left position.

Since the lock release lever 65 is held in position by the engagement of its lug 67 with the pin 68, the lock lever 69 is held against the lever 65 so that its arcuate end 84 is positioned within a locus described by movement of the pin 19 of the control wheel 12 as seen in FIG. 6. The pin 68 will be disengaged from contact with the lug 67 when the lock lever 65 is pushed counterclockwise by the lever 69 when in solenoid 50 is subsequently energized in response to a pulse of about 0.1 seconds to restore the slide plate 31 as will be described later. It is seen that the 0.3-second period is so selected that the lock release lever 65 is held in a position of engagement with the pin 68 until the slide plate 31 is moved to that position by the action of the bell crank 37 in response to the aforesaid rightward movement of the control member 21. In other words, the solenoid 50 is de-energized before the hook lever 43 would otherwise come into engagement with the bell crank 37 when the control wheel 21 has rotated to an approximately 180° position with respect to its stop position.

It will be understood by inspection of FIG. 6 that the tape recorder is in the same operative position as the stop position of FIG. 1 except that the slide plate 31 is engaged with the lock release lever 65, so that the recorder can be set in the playback mode again from the cueing mode by energizing the solenoid 50 again for an interval of 0.6 seconds. More specifically, when a 0.6-second pulse is applied to the solenoid 50 in response to the termination of the cueing operation, the rotary wheel 12 is set in rotation again in the same manner as described with reference to FIGS. 2 and 3. By the end of a complete revolution of the wheel 12, the control member 21 has reached its left position and during this leftward movement, the hook lever 43 of the control member 21 engages the bell crank 37 to turn it clockwise to move the slide plate 31 in the direction E causing the pin 68 to disengage from contact with the lug 67, thus setting the recorder in the playback position of FIG. 5 again.

The tape recorder can be set into a stopped condition from the playback mode by simply disengaging the bell crank 52 from contact with the pin 20. A period of about 0.1 seconds is sufficient to energize the solenoid 50 for this purpose. This allows the rotary wheel 12 to engage its pin 18 with lever 26 to turn it counterclockwise unlocking the control member 21 with the latter moving to the right by the action of spring 24. The bell crank 37, which has been in engagement with the hook lever 43, is allowed to rotate counterclockwise by spring 39 to move the slide plate or head carrier member 31 in the direction D. In this instance, the bell crank 75 is unlocked from the lug 83 and applies brake to the reel wheels 1 and 2.

This braking operation differs from the one employed in conventional tape recorders in that it applies brake every time the tape recorder is switched to a different operational mode. Since the control member 21 is returned to its right position at a high speed by the action of spring 24, brake is quickly applied in response to the energization of solenoid 50. Due to the low-speed leftward movement of the control member 21 by the camming action of cam 14, the reel wheels 1 and 2 are completely halted prior to the time the recorder is switched to a subsequent mode of operation.

When stopping the tape recorder from the cueing operation, the solenoid 50 is energized in response to a pulse of 0.1 second period with the recorder being in the operative position indicated in FIG. 6. Although the application of this pulse to the solenoid may cause the lever 69 to be pushed by bell crank 52, this lever returns to the original position before the pin 19 comes into engagement with the end 84 of the lever 69 by the rotation of wheel 12 which is triggered in response the solenoid being energized.

Figure 7:
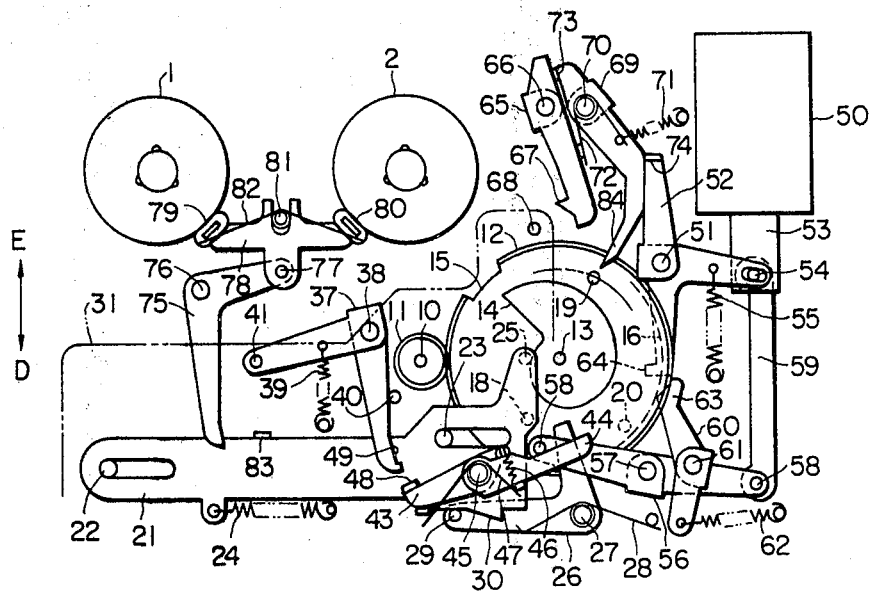
FIG. 7 is an illustration of the mechanism in its stop position which occurs in response to application of a 0.1-second pulse to the solenoid.

Since the apparatus operated during fast-forward or rewind mode has the same operational positions as illustrated in FIG. 1 with the exception that the reel motor 3 is run at a higher speed than playback or recording speed, the stop operation for such modes results in the apparatus assuming positions illustrated in FIG. 7 which differs from FIG. 1 in that the former involves braking applied to the reel wheels 1 and 2.

The solenoid activating pulse of different periods may be generated from a pulse generating circuit in response to the operation of one of the various operating keys or switches according to their particular functions. Alternatively, the pulse may be generated by a switching circuit which is operated for different intervals depending on the angular position of the rotary wheel 12.

In summary, the solenoid 50 is energized for a short interval of time (0.1 seconds) to effect stopping operation by simply unlocking the wheel 12 to set it in motion. Cueing operation or the like is effected during playback mode by energizing the solenoid for a medium interval of 0.3 seconds which is substantially equal to the amount of time commencing in response to the unlocking of wheel 12 from its stop position and terminating in response to engagement of the slide or carrier plate 31 with the lock lever 65 as the former is returning to its stop position. Playback or recording operation is achieved either from the stop position or from cueing mode position by energizing the solenoid for a long interval of 0.6 seconds which substantially corresponds to the amount of time commencing in response to the unlocking of wheel 12 causing the control member 21 to return to the right position and terminating in response to engagement of hook lever 43 with bell crank 37 by the leftward movement of the control member 21 due to the camming action of cam 14, which engagement occurs only when the solenoid is energized for an interval greater than 0.3 seconds.

With the exception of the spring-loaded members 52 and 56, a very small amount of power is required for the solenoid 50 to operate the other members of the mechanism of the invention, since the power needed to operate other spring-loaded members, such as control member 21, lock lever 69, lock release member 65, bell crank 26, is borne by the control rotary wheel 12. Further, since the rotary wheel 12 is driven by the capstan motor 7 through a 2-stage gear or speed reduction system including pulley 8, belt 9, flywheel 6 and toothed wheel 11, the amount of torque required for the motor 7 is considerably small and therefore the power consumption during mode switching operations is negligibly small. Because of the short duration of pulses applied to solenoid 50 which exceeds no more than 0.6 seconds, the power consumption of the solenoid is also considerably smaller than that required with conventional electrically switched tape recorders. Therefore, the present invention is particularly suited for battery-powered portable cassette tape recorders.

In conventional electrically switched tape recorders impact producing actions are involved which might cause dislocation of a cassette from its set position. Whereas, according to the invention, shock-free, smooth switching operation is ensured due to the fact that the various operating members are operated in a rotation-to-translational motion which is mainly powered from the rotating wheel 12.

The tape recorder of the invention is thus simple in design and less costly than conventional recorders due to the use of a single solenoid and allows a compact design because the low power consumption of the solenoid permits it to be assembled with other mechanical components with a relatively high packing density. This is particularly suitable for modern cassette tape recorders having a reduced height.

What is claimed is:

1. A tape recording and reproducing apparatus having a plurality of manually operated keys for effecting various operations, an electromagnetic transducer, a motor, and a mode switching mechanism, said mode switching mechanism comprising:
   a single solenoid energizable in response to pulses applied thereto of different durations dependent upon selective operation of said operating keys, said different pulses being respectively of relatively long, intermediate and relatively short durations;
   a movable carrier member carrying thereon said electromagnetic transducer and movable between a first position wherein said transducer is displaced from a recording tape and a second position wherein said transducer fully contacts said recording tape;
   a rotary wheel engageable through a drive gear with said motor, said rotary wheel revolving 360° from a predetermined angular position in response to energization of said solenoid;
   means for moving said movable carrier member to said second position using rotational power of said rotary wheel when said solenoid is energized for substantially the long duration and moving said carrier member from said second position to said first position in response to subsequent energization of said solenoid; and
   locking means movable a variable distance dependent upon the period of solenoid energization from an inactive position towards an active position for locking said carrier member in an intermediate position between said first and second positions to allow said transducer to make slight contact with said tape, whereby subsequent energization of the solenoid for substantially the intermediate duration causes said carrier member to move from said second position to said intermediate position to be locked therein and a subsequent energization of said solenoid for substantially the short duration causes said carrier member to move from said second or intermediate position to said first position.

2. A mechanism as claimed in claim 1, wherein said carrier member moving means comprises:
   a spring-loaded member movable between first and second positions and normally biased toward its first position;
   a cam mounted on said rotary wheel for rotation therewith for moving said spring-loaded member from its first to second position by the rotation of said rotary wheel;
   means for locking said spring-loaded member in its second position when said spring-loaded member reaches its second position and unlocking said spring-loaded member from said second position in response to the energization of said solenoid; and
   means including a lever pivotally mounted on said spring-loaded member for engaging with said carrier member when said spring-loaded member has been moved from its first position to a predetermined intermediate position by the action of said cam during the time said solenoid is energized so that said carrier member is moved from its first to second position.

3. A mechanism as claimed in claim 2, wherein said cam includes a straight edge portion and a contoured camming surface in contact with said spring-loaded member, said straight edge portion coinciding with said predetermined angular position of said rotary wheel to allow said spring-loaded member to move along said straight edge portion toward its first position in response to said spring-loaded member being unlocked.

4. A mechanism as claimed in claim 1, wherein said locking means comprises:
   a first pivoted member;
   a spring for urging said first pivoted member in one direction;
   a second pivoted member adjacent said first pivoted member and resiliently movable with said first pivoted member by the action of said spring and having a notch; and
   means for moving said first and second pivoted members against the action of said spring during the time said solenoid is energized to thereby engage said notch with said carrier member when same is in said intermediate position;
   said first pivoted member having an end portion engageable with said rotary wheel when same is angularly displaced from said predetermined angular position for disengaging said notch from said carrier member by the rotation of said rotary wheel.

5. A mechanism as claimed in any one of the preceding claims, further comprising a speed reduction system for transmitting the rotary motion of said motor to said rotary wheel.

6. A mechanism as claimed in claim 5, wherein said rotary wheel is formed with a toothed portion and a recess around the circumference thereof, and wherein said speed reduction system includes a toothed wheel in mesh with said toothed portion of said rotary wheel during the time said solenoid is energized and positioned in said recess during the time said solenoid is de-energized, said solenoid including a plunger for causing said rotary wheel to come into meshing engagement with said toothed wheel in response to the energization of said solenoid.

7. In a tape recording and reproducing apparatus having a plurality of manually operated keys for effecting various functions, a motor, and means for generating a pulse in response to the operation of any one of said keys, the durations of said pulses being respectively relatively long, intermediate and relatively short depending on the function of the operated key, the improvement comprising a single solenoid energized in response to said pulse;

a movable carrier member carrying thereon an electromagnetic transducer and movable between a first position in which said tansducer is displaced from a recording tape and a second position in which said transducer is in full contact with said tape;

a rotary wheel engageable through a drive gear with said motor, said rotary wheel revolving 360° from a predetermined angular position in response to energization of said solenoid;

means for moving said movable carrier member to said second position using rotational power of said rotary wheel when said solenoid is energized substantially for the long duration and moving said carrier member from said second position to said first position in response to subsequent energization of said solenoid; and locking means movable a variable distance dependent upon the period of solenoid energization from an inactive towards and active position for locking said carrier member in an intermediate position between said first and second positions to allow said transducer to make slight contact with said tape, whereby subsequent energization of said solenoid for substantially the intermediate duration causes said carrier member to move from said second position to said intermediate position to be locked therein and a subsequent energization of said solenoid for substantially the short duration causes said carrier member to move from said second or intermediate position to said first position.

8. A tape recording and reproducing apparatus as claimed in claim 7, wherein said carrier member moving means comprises:

a spring-loaded member movable between first and second positions and normally biased toward its first position;

a cam mounted on said rotary wheel for rotation therewith for moving said spring-loaded member from its first to second position by the rotation of said rotary wheel;

means for locking said spring-loaded member in its second position when said spring-loaded member reaches its second position and unlocking said spring-loaded member from said second position in response to the energization of said solenoid; and means including a lever pivotally mounted on said spring-loaded member for engaging with said carrier member when said spring-loaded member has been moved from its first position to a predetermined intermediate position by the action of said cam during the time said solenoid is energized so that said carrier member is moved from its first to second position.

9. A tape recording and reproducing apparatus as claimed in claim 8, wherein said cam includes a straight edge portion and a contoured camming surface in contact with said spring-loaded member, said straight edge portion coinciding with said predetermined angular position of said rotary wheel to allow said spring-loaded member to move along said straight edge portion toward its first position in response to said spring-loaded member being unlocked.

10. A tape recording and reproducing apparatus as claimed in claim 7, wherein said locking means comprises:

a first pivoted member;

a spring for urging said first pivoted member in one direction;

a second pivoted member adjacent said first pivoted member and resiliently movable with said first pivoted member by the action of said spring and having a notch; and means for moving said first and second pivoted members against the action of said spring during the time said solenoid is energized to thereby engage said notch with said carrier member when same is in said intermediate position;

said first pivoted member having an end portion engageable with said rotary wheel when same is angularly displaced from said predetermined angular position for disengaging said notch from said carrier member by the rotation of said rotary wheel.

11. A tape recording and reproducing apparatus as claimed in claim 7, 8, 9, or 10, further comprising a speed reduction system for transmitting the rotary motion of said motor to said rotary wheel.

12. A tape recording and reproducing apparatus as claimed in claim 11, wherein said rotary wheel is formed with a toothed portion and a recess around the circumference thereof, and wherein said speed reduction system includes a toothed wheel in mesh with said toothed portion of said rotary wheel during the time said solenoid is energized and positioned in said recess during the time said solenoid is de-energized, said solenoid including a plunger for causing said rotary wheel to come into meshing engagement with said toothed wheel in response to the energization of said solenoid.

13. A tape recording and reproducing apparatus as claimed in claim 12, wherein said toothed wheel is coaxially mounted on the axis of a capstan for rotation therewith.

14. A tape recording and reproducing apparatus as claimed in claim 7, wherein the functions of said operating keys include playback, record, cueing, fast-forward, rewind and stopping operations of the recording tape, and wherein said pulse generated in response to the operation of said keys having the functions of playback and record has a large value of duration, said pulse generated in response to the operation of the keys having the functions of cueing, fast-forward and rewind having a medium value of duration, and said pulse generated in response to the operation of the key having the function of stopping operation having a small value of duration.

15. A tape recording and reproducing apparatus as claimed in claim 13, wherein said large value of duration is substantially equal to the time it takes to provide said 360° revolution of said rotary wheel.

* * * * *